United States Patent [19]
McGrath et al.

[11] Patent Number: 6,132,883
[45] Date of Patent: Oct. 17, 2000

[54] TRANSPARENT POWDER COATING COMPOSITIONS FOR PROTECTING SURFACES

[75] Inventors: Joseph M. McGrath, Lake Elmo; Suman K. Patel, Woodbury, both of Minn.

[73] Assignee: 3M Innovative Properties Company, St. Paul, Minn.

[21] Appl. No.: 08/850,875

[22] Filed: May 2, 1997

[51] Int. Cl.$^7$ .............................. B32B 15/08; B05D 1/04; G09F 7/00; C08L 33/04
[52] U.S. Cl. .......................... 428/457; 428/461; 428/469; 428/595; 525/222; 525/329.7; 40/200; 40/615; 427/458; 427/421; 427/375; 427/475
[58] Field of Search ...................... 428/457, 461, 428/500, 469, 472, 595, 460, 689, 934, 939, 913.3, 41.5, 42.1; 40/200, 208, 615, 616, 612; 525/55, 222, 170, 418, 169, 221, 240, 919, 329.7, 330.2; 156/150, 62.2; 359/546, 547, 548, 551; 524/902; 427/375, 421, 422, 458, 475

[56] References Cited

U.S. PATENT DOCUMENTS

| | | | |
|---|---|---|---|
| 3,959,539 | 5/1976 | Waggoner | 428/35 |
| 4,109,037 | 8/1978 | Nohara | 428/35 |
| 4,664,966 | 5/1987 | Bailey et al. | 428/203 |
| 4,983,436 | 1/1991 | Bailey et al. | 428/40 |
| 5,179,168 | 1/1993 | Hirasawa | 525/221 |
| 5,344,883 | 9/1994 | Loar et al. | 525/170 |
| 5,443,765 | 8/1995 | Yoshimura et al. | 264/22 |
| 5,468,532 | 11/1995 | Ho et al. | 428/40 |
| 5,601,889 | 2/1997 | Chundury et al. | 428/34.3 |
| 5,706,133 | 1/1998 | Orensteen et al. | 359/530 |
| 5,728,502 | 3/1998 | On-Yang et al. | 430/126 |
| 5,819,449 | 10/1998 | Molson | 40/200 |

FOREIGN PATENT DOCUMENTS

| | | |
|---|---|---|
| 44 27 085 | 2/1996 | Germany . |
| 4427085 | 2/1996 | Germany . |
| 7-171871 | 7/1995 | Japan . |
| WO 93/09188 | 5/1993 | WIPO . |

OTHER PUBLICATIONS

C. Rauwendaal, "Polymer Extrusion", Hanser Publishers, pp. 175–6 (Section 6.1.3, Particle Size and Shape), 1990, (No Month).
Patent Abstracts of Japan, vol. 095, No. 010, Nov. 30, 1995 and JP 07 171871 A, Jul. 11, 1995.

*Primary Examiner*—Deborah Jones
*Assistant Examiner*—Michael LaVilla
*Attorney, Agent, or Firm*—Doreen S. L. Gwin

[57] ABSTRACT

Powder coating compositions are described containing a blend of ionomers and polyethylene copolymers which fuse at temperatures of about 150° C. or below and are durable, weatherable, solvent-resistant, and thereby provide transparent protective coatings on substrates such as signs, particularly traffic signs and license plates.

9 Claims, No Drawings

TRANSPARENT POWDER COATING COMPOSITIONS FOR PROTECTING SURFACES

FIELD OF THE INVENTION

This invention relates to powder coating compositions that are capable of being fused to surfaces at relatively low temperatures to provide protection against weather, solvents and abrasion.

BACKGROUND OF THE INVENTION

Powder coatings are a segment of the industrial coatings industry that has undergone rapid growth. There are two broad categories of powder coatings—thermosetting and thermoplastic. By far the major portion of the market is for thermosetting powders. The first powder coatings were thermoplastic coatings that formed films by coalescence without cross-linking. Thermoplastic coatings have several disadvantages compared to thermosetting coatings. They are generally difficult to pulverize to small particle sizes. Thus they are generally applied in relatively thick films. Owing to the high molecular weights of the binders required, even at high baking temperatures, they are viscous and often give poor flow and leveling.

A long recognized problem in the powder coating industry is finding powders that fuse at relatively low temperatures, for example around 150° C. These low temperatures for fusing powder coatings are needed for heat sensitive substrates such as plastics, painted surfaces, and wood. Lower temperature fusing powders also offer energy savings even for metal substrates that can use conventional powder coatings that fuse around 200° C. Powders that fuse at around 150° C. are not commonly available in thermoplastic formulations because the resulting fused coatings have severe deficiencies in one or more properties, such as solvent resistance, abrasion resistance, durability and chemical resistance. A few powders with thermosetting chemistries that fuse around 150° C. are available or are being developed within the powder coating industry. These coatings require long times to cure at these low temperatures, thus limiting their utility and increasing costs, or require radiation curing equipment which also increases the costs of these coatings. These low temperature fusing, thermosetting powder coatings are also likely to be deficient in exterior weatherability and flexibility. The reactivity of thermosetting powder coatings also raises worker safety concerns.

Blends of polymers do not, in general, lead to coatings with good clarity. Often, hazy coatings result due to some incompatibility of the polymers being blended.

SUMMARY OF THE INVENTION

Despite the above recognized problems, i.e., lack of success with thermoplastic polymers and clear coatings with blends, we have found a thermoplastic powder coating composition which comprises a compatible blend of polymers where the powder composition fuses at a relatively low temperature, about 150° C. or below. The new powder compositions are transparent after fusing, i.e., approximately equal or greater than 90% as determined directly by percent transmittance measurements or by the retroreflection of light going through the coating. The present powder compositions after fusing are also durable, weatherable, solvent-resistant, flexible and tightly adherent, and are useful as protective coats, e.g. top coats, for license plates, traffic signs, retroreflective sheetings, painted surfaces, and plastic surfaces.

Accordingly, the present invention is an adherent, transparent powder coating composition comprising a compatible blend of (a) about 50–85 parts by weight (based on total polymer content) of an ionomer resin; and (b) about 15–50 parts by weight of a low molecular weight copolymer of ethylene and acrylic or methacrylic acid. More preferred compositions include about 60–80 parts by weight of the ionomer resin and about 20–40 parts by weight of the low molecular weight copolymer of ethylene and acrylic acid. The compositions may also include stabilizers and additives in a minor amount, for example about 1–5 parts by weight.

A second aspect of the present invention is a method of protecting a sign comprising the steps of (a) applying to a surface of said sign having a plurality of image-bearing and non-image-bearing areas a powder composition as above described, and (b) fusing said powder composition to form a transparent protective layer over said image-bearing and non-image-bearing areas.

The powder clear coats of this invention offer improved protection to the coated substrates from: mechanical damage, such as from abrasion or impact; high pressure washing; solvent attack; detergent; acid rain; hydrolysis; ultraviolet light degradation; fading; fungal or microbial attack; alteration; and vandalism. An important application is the protection of printed information over reflective sheeting such as license plate registration numbers, validation information, printed frames and graphic designs.

DETAILED DESCRIPTION

The powder coatings of the present invention as well as the resulting protective coat after fusion on a surface or substrate includes a compatible blend of polymers.

The major component of the blend is an ionomer resin which is a copolymer of monomers comprising by weight a major proportion of at least one of ethylene and propylene and a minor proportion of an acid-functional monomer such as acrylic acid or methacrylic acid, which copolymer has been cross-linked by cations such as zinc, sodium, or potassium. Zinc is preferred, because it affords good resistance to weathering. Ionomer resins are defined, for example, in U.S. Pat. No. 4,109,037. Preferred commercially available ionomeric ethylene copolymers are polymers of the so-called "SURLYN" series from E. I. duPont deNemours & Co. A particularly preferred SURLYN copolymer is ABCITE AB1060N which is a copolymer of by weight a major proportion of ethylene and a minor proportion of methacrylic acid ionically cross-linked with zinc ions.

The second component in the composition is a low molecular weight copolymer of ethylene and acrylic or methacrylic acid. Such polymers are preferably low molecular copolymers of ethylene and acrylic acid, for example those found under the trade name PRIMACOR obtained from Dow Chemical. By low molecular weight, these include polymers having high melt index values. A particularly preferred copolymer is PRIMACOR 5990I which has a melt index of about 1300 dg/min under ASTM D1238 Condition (B), 125° C./2.16 kg.

The compositions may also contain stabilizers. These stabilizers are so-called weathering stabilizers and are generally included in polymeric films, and include ultraviolet light absorbers, antioxidants, and materials that scavenge or inhibit the action of chemical radicals within the films. Particularly useful as stabilizers are antioxidants such as hindered phenols, UV stabilizers such as hindered amines, and UV light absorbers.

The compositions may also contain additives which aid the flow of the powder compositions. The additives include both dry-flow and melt-flow additives. Dry-flow additives include, for example, fine particles of silica, fumed silica both treated and untreated, finely divided aluminum oxide, feldspar, calcium silicate, and the like. Melt-flow additives include, for example, benzoin, low molecular weight acrylics, microcrystalline waxes, and the like.

The powder coatings of the present invention are manufactured by well known methods basically through the steps of pre-mixing the ingredients, melt extrusion of the blend and pulverization. The extruder is preferably a twin screw extruder for this process.

For example, the ingredients included in the composition of the present invention may be mechanically mixed using a twin screw extruder (e.g., a variable speed twin screw extruder such as produced by Baker Perkins or Werner Pfleiderer). Preferably, the extruder generates a melt temperature of approximately 150° C. to approximately 225° C. during extrusion. The extruded product may be hammer milled and cryogenically ground to generate a mixture having particle sizes ranging from about 5 to about 200 micrometers, preferably with mean size from about 5 to about 100 micrometers, and more preferably from about 10 to about 60 micrometers. The resulting material may be added to the toner hopper of a powder coating application system, e.g., a Tribomatic II Powder Coating System available from Nordson Co. of Amherst, Ohio, and then applied to the desired surface. Alternatively, the material may be added to the toner hopper of a laser printer, e.g., Siemens Model 2090 Laser Printer available from Siemens Nixdorf, Poing, Germany.

The powder coating compositions of the present invention are especially useful for protection of signs. Signs such as traffic signs and license plates feature a backing in which a plurality of images, e.g., alpha-numeric characters, symbols, artwork, and the like (the "image-bearing areas") is set against a background (the "non-image-bearing areas"). The characters may be clear, in which case the background is colored. Alternatively, the sign may consist of colored characters set against a clear background. The characters typically are formed using techniques such as embossing (in which the characters are defined mechanically) or printing (in which the characters are defined electronically, digitally or mechanically).

Often the signs are provided with a retroreflective property to enhance visibility. Typically, the backing itself may be a retroreflective sheet adhesively bonded to substrates such as aluminum, steel or plywood. To protect the sign from, e.g., weathering and abrasion, a clear "top coat" may be included as well.

As used herein, "image-bearing area" refers to images such as alpha-numeric characters, symbols, artwork, graphics, and the like appearing on the surface of the sheet. "Non-image-bearing" area refers to any area of the sheet that lacks said images.

The above-mentioned protective coat or "top coat" may be applied, preferably, by depositing the essentially solvent-free powder composition of the present invention to the surface of the sheeting, followed by heating to fuse the powder particles into the form of a continuous film.

Electrostatic spray is the major process for applying powder coatings. An electrostatic spray gun consists essentially of a tube to carry airborne powder to an orifice with an electrode located at the orifice. The electrode is connected to a high-voltage (about 5–100 kv), low-amperage power supply. As the powder particles come out of the orifice they pass through a cloud of ions, called a corona and pick up a negative or positive electrostatic charge. The object to be coated is electrically grounded. The difference in potential attracts the powder particles to the surface of the part. They are attracted most strongly to areas that are not already covered, forming a reasonably uniform layer of powder even on irregularly shaped objects. The particles cling to the surface strongly enough and long enough for the object to be conveyed to a baking oven, where the powder particles fuse to form a continuous film, flow, and optionally cross-linked. The powder particles of the present invention are capable of fusing at an oven temperature of about 150° C. or below (but not below about 100° C.).

The powder particles that do not adhere to the object to be coated (overspray) can be recovered and recycled, typically, by blending with virgin powder. Almost 100% is used eventually—a major advantage over spray-applied liquid coatings.

Other conventional techniques can be adopted to include: electrostatic or thermal fluidized bed, knife coating, gravity feed and water suspended powder spray.

Powder coatings of this invention have essentially no volatile organic content unlike either solvent borne or water borne coating alternatives, and the overspray can be reused rather than being hazardous waste. Powder coatings of this invention also have advantages over laminated film alternatives. No adhesive or liner is required with powder coatings as would be the usual situation with a film lamination. Powders also conform to embossed or irregular surfaces better than a film would. A film based on the same composition as the inventive powders is, however, useful for lamination to flat or gently curved substrates and should be considered as part of the present invention.

The invention will now be described further by way of the following examples. All amounts are given in parts by weight unless otherwise noted.

EXAMPLES

Glossary

| | |
|---|---|
| Abcite ™ AB1060N | Copolymer of ethylene and methyl acrylic acid cross-linked with zinc ions (E.I. duPont deNemours & Co.) |
| Primacor ™ 59901 | Low molecular weight ethylene acrylic acid copolymer (Dow) |
| Tinuvin ™ 900 | 2-[2-hydroxy-3,5-di-(1,1-dimethylbenzyl)-phenyl]-2H-benzotriazole (Ciba-Geigy) |
| Tinuvin ™ 144 | Bis(1,2,2,6,6-pentamethyl-4-piperadinyl)-(3,5-di-t-butyl-4-hydroxybenzyl) butyl propane-dioate (Ciba-Geigy) |
| Irganox ™ 1010 | Tetrakis[methylene(3,5-di-t-butyl-4-hydroxy-hydrocinnamate)] methane (Ciba-Geigy) |
| Tinuvin ™ 328 | 2-(2'-hydroxy-3,5'-di-t-amylphenyl) benzotriazole (Ciba-Geigy) |
| Chimassorb ™ 944LD | Bis-tetramethylpiperadinylhexanediamine polymer, trichlorotriazine, trimethylpentan-amine (Ciba-Geigy) |
| Primacor ™ 5980I | Ethylene acrylic acid copolymer, higher molecular weight (Dow) |
| Acryloid ™ A-11 | Homopolymer of methylmethacrylate (Rohm & Haas) |
| Acryloid ™ B-66 | Methyl/butylmethacrylate copolymer (Rohm & Haas) |
| V3M30 | Ethylene glycol/isophthalate polyester (Plast-o-meric Inc.) |
| Morthane ™ L425.91 | Thermoplastic aliphatic polyurethane resin (Morton International) |
| THV 200 | Fluoropolymer resin (Dyneon) |

Example 1

71.4 parts Abcite™ AB1060N EMAA/zinc ionomer
28.6 parts Primacor™ 5990I EAA copolymer
3.0 parts stabilizers (1 part each of Tinuvin™ 900, Tinuvin™ 144, Irganox™ 1010)

Example 2

70.0 parts Abcite™ AB1060N
30.0 parts Primacor™ 5990I
3.0 parts stabilizers (1 part each of Tinuvin™ 328, Chimassorb™ 944LD, Irganox™ 1010)

Example 3

60.0 parts Abcite™ AB1060N
40.0 parts Primaco™ 5990I
3.0 parts stabilizers (1 part each of Tinuvin™ 328, Chimassorb™ 944LD, Irganox™ 1010)

Example 4

70.0 parts Abcite™ AB1060N
30.0 parts Primacor™ 5990I

The above compositions of Examples 1–4 were mixed in a small twin screw compounder and pressed into thin films (1–2 mil) between release liners using a platen press with both platens at 135° C. These films were pressed against aluminum license plate blanks having reflective sheeting applied to the front sides using the same platen press. The resulting samples were fused using infrared heaters to simulate fusing of powder coatings. The fusing oven was operated to provide a temperature of about 150° C. for about 1 minute. The resulting coatings had good adhesion to 3M brand Scotchlite brand Reflective License Plate Sheeting No. 4770, good clarity, and good resistance to gasoline (1 minute soak), toluene (1 minute soak) and methyl alcohol (10 minute soak). Small samples of the compositions of Examples 1, 2 and 3 were cryogenically ground. These powders were sprinkled over retroreflective sheeting on aluminum license plate blanks, fused and tested as were the previous laminated film samples, also showing good adhesion, clarity and solvent resistance.

Comparative Example 1

71.4 parts Primacor™ 5980I EAA copolymer (higher molecular weight)
28.6 parts Primacor™ 5990I EAA copolymer (low molecular weight)
3.0 parts stabilizers (1 part each of Tinuvin™ 900, Tinuvin™ 144 and Irganox™ 1010)

Comparative Example 2

71.4 parts V3M30 ethylene glycol/isophthalate polyester
28.6 parts Morthane™ L425.91 thermoplastic, aliphatic polyurethane
3.0 parts stabilizers (as in Comparative Ex. 1)

Comparative Example 3

71.4 parts Acryloid™ A-11
28.6 parts V3M30 polyester
3.0 parts stabilizers (as in Comparative Ex. 1)

Comparative Example 4

71.4 parts DuPont Nucrel™ 699 EMAA
28.6 parts Morthane™ L425.91 polyurethane
3.0 parts stabilizers (as in Comparative Ex. 1)

Comparative Example 5

71.4 parts Acryloid™ A-11
28.6 parts Morthane™ L425.91 polyurethane
3.0 parts stabilizers (as in Comparative Ex. 1)

Comparative Example 6

80.0 parts Acryloid™ B66 acrylic copolymer
20.0 parts Morthane™ L425.91 polyurethane
3.0 parts stabilizers (1 part each of Tinuvin™ 328, Chimassorb™ 944LD, Irganox™ 1010)

Comparative Example 7

70.0 parts Acryloid™ B66
30.0 parts THV 200 fluoropolymer
3.0 parts stabilizers (as in Comparative Ex. 6)

The compositions of Comparative Examples 1–7 were each mixed in a small twin screw compounder. None of them had good clarity. Extrusion compounded samples of Comparative Examples 4, 6 and 7 were made into films and laminated to retroreflective sheeting on aluminum license plate blanks using the platen press and fusing oven as described for Examples 1–4. These samples all had poor clarity and poor resistance to gasoline and toluene.

Comparative Example 8

90.0 parts Abcite™ AB1060N EMAA/zinc ionomer
10.0 parts Primacor™ 5990I EAA copolymer
3.0 parts stabilizers (as in Comparative Ex. 6)

Example 5

80.0 parts Abcite™ AB1060N
20.0 parts Primacor™ 5990I
3.0 parts stabilizers (as in Comparative Ex. 6)

Comparative Example 9

50.0 parts Abcite™ AB1060N
50.0 parts Primacor™ 5990I
3.0 parts stabilizers (as in Comparative Ex. 6)

These three compositions (Comparative Examples 8 and 9 and Example 5) are different blend ratios of materials previously seen to give good results. These samples were each mixed in a small twin screw compounder to give strands that were pressed into films and then laminated and fused over retroreflective sheeting on aluminum license plate blanks as described above for Examples 1–4. Compositions from Comparative Example 8 had poor adhesion to each of the 3M brand Scotchlite brand Reflective License Plate Sheetings, No. 3750, No. 4750, and No. 4770 that were tested. The sample from Comparative Example 9 had good adhesion to No. 3750 and No. 4770 sheetings but had poor resistance to gasoline and methanol. Example 5 gave good results, i.e. good adhesion and solvent resistance.

Adhesion is reported in the subsequent tables from "Poor" to "Good" and was observed using the "Tape Snap Adhesion" test or Cross-Cut Tape Test ASTM D 3359-93.

Example 6

Following examples each were stabilized with 1.0 pph Tinuvin™ 328, 1.0 pph Chimassorb™ 944LD and 1.0 pph Irganox™ 1010. Each composition was mixed in a small twin screw compounder and pressed into thin films between release liners using a platen press with both platens at 135° C. These films were pressed, using the same platen press and conditions, and then laminated and fused over reflecting sheeting on aluminum license plates.

Coatings Over 3M SCOTCHLITE Brand #4770
License Plate Sheeting Over Aluminum Substrate

| | | | | Example | | | | |
|---|---|---|---|---|---|---|---|---|
| AB1060N/5990I | C8 90/10 | 5 80/20 | 75/25 | 2 70/30 | 65/35 | 3 60/40 | 55/45 | C9 50/50 |
| Tape Snap Adhesion | Poor | Good | Good | Good | Good | Good | Good | Good |
| Gasoline Soak (1 min.) | — | Good | Good | Good | Marginal | Fail (Hazy) | Fail (Hazy) | Fail (Hazy) |
| Toluene Soak (1 min.) | — | Good | Good | Good | Marginal | Fail (Hazy) | Fail (Hazy) | Good |
| Methanol Soak (10 min.) | — | Good | Good | Good | Good | Fail (Hazy) | Fail (Hazy) | Fail (Hazy) |

Coatings Over 3M SCOTCHLITE Brand #3750
License Plate Sheeting Over Aluminum Substrate

| AB1060N/5990I | 90/10 | 80/20 | 75/25 | 70/30 | 65/35 | 60/40 | 55/45 | 50/50 |
|---|---|---|---|---|---|---|---|---|
| Tape Snap Adhesion | Poor | Good | Good | Poor | Good | Good | Good | Good |
| Gasoline Soak (1 min.) | — | Good | Good | Good | Marginal | Fail (Hazy) | Marginal | Fail (Hazy) |
| Toluene Soak (1 min.) | — | Good | Good | Good | Pass | Fail (Hazy) | Pass | Pass |
| Methanol Soak (10 min.) | — | Good | Good | Good | Good | Fail (Hazy) | Pass | Fail (Hazy) |

Example 7

Stabilizers were reduced from the levels used in the above examples. The following examples each were stabilized with 0.5 pph Tinuvin™ 328, 0.5 pph Chimassorb™ 944LD and 0.05 pph Irganox™ 1010. Each composition was mixed in a small twin screw compounder and pressed into thin films between release liners using a platen press with both platens at 135° C. These films were pressed, using the same platen press and conditions, and then laminated and fused over reflective sheeting on aluminum license plates.

Coatings Over 3M SCOTCHLITE Brand #4770
License Plate Sheeting Over Aluminum Substrate

| AB1060N/5990I | 80/20 | 70/30 |
|---|---|---|
| Tape Snap Adhesion | Good | Good |
| Gasoline Soak (1 min.) | Good | Good |
| Toluene Soak (1 min.) | Good | Good |
| Methanol Soak (10 min.) | Good | Good |

Example 8

These same compositions were tested over the following roll coat ink and sheeting combinations.

| 3M SCOTCHLITE Brand Roll Coat Inks and Sheetings | 4805/ 3750 | 4805/ 4750 | 4805/ 3750 | 4805/ 4750 | 4852/ 3750 | 4852/ 4750 | 4852/ 3750 | 4852/ 4750 | 4902W/ 3750 |
|---|---|---|---|---|---|---|---|---|---|
| AB1060N/5990I | 80/20 | 80/20 | 70/30 | 70/30 | 80/20 | 80/20 | 70/30 | 70/30 | 80/20 |
| Tape Snap Adhesion | Good | Good | Good | Good | Good | Good | Good | Good | Good |
| Gasoline Soak (1 min.) | Good | Good | Good | Good | Good | Good | Good | Good | Good |
| Toluene Soak (1 min.) | Good | Good | Good | Good | Good | Good | Good | Good | Good |
| Methanol Soak (1 min.) | Good | Good | Good | Good | Good | Good | Good | Good | Good |

We claim:

1. A powder coating composition comprising a compatible blend, having a particle size from about 5 to about 200 micrometers, of:
   (a) about 50 to about 85 parts by weight, based on total polymer content, of an ionomer resin; and
   (b) about 15 to about 50 parts by weight of a low molecular weight copolymer of ethylene and acrylic or methacrylic acid;
wherein said composition is capable of being transparent after fusing at a temperature of about 150° C. or below.

2. The composition of claim 1 further comprising about 1–5 parts by weight of stabilizers.

3. The composition of claim 1 comprising a blend of:
   (a) about 60–80 parts by weight of said ionomer; and
   (b) about 20–40 parts by weight of said low molecular weight copolymer of ethylene and acrylic or methacrylic acid.

4. The composition of claim 1, wherein said ionomer resin (a) is a copolymer of ethylene and methacrylic acid cross-linked with zinc cations.

5. The composition of claim 1, wherein (b) is a low molecular weight copolymer of ethylene and acrylic acid.

6. A license plate comprising a protective coat fused thereon comprising the composition of claim 1.

7. A method of protecting a sign comprising the steps of:
   (a) applying by electrostatic deposition to a surface of a sign having a plurality of image-bearing and non-image-bearing areas a powder composition according to claim 1; and
   (b) fusing said powder composition to form a transparent protective layer over said image-bearing and non-image-bearing layers.

8. The method of claim 7, wherein said powder composition is fused at a temperature of about 150° C. or below.

9. The method of claim 7, wherein the sign is a license plate.

* * * * *

UNITED STATES PATENT AND TRADEMARK OFFICE
CERTIFICATE OF CORRECTION

PATENT NO.    : 6,132,883                                    Page 1 of 1
DATED         : October 17, 2000
INVENTOR(S)   : McGrath et al.

It is certified that error appears in the above-identified patent and that said Letters Patent is hereby corrected as shown below:

Column 5,
Line 16, "Primaco" should read --Primacor--.

On the title page, in the section entitled Foreign Patent Documents"
"WIPO" should read ---PCT---.

Signed and Sealed this

Thirty-first Day of July, 2001

Attest:

NICHOLAS P. GODICI
Attesting Officer    Acting Director of the United States Patent and Trademark Office